Oct. 1, 1929.                J. F. O'CONNOR                1,729,626
                                 BRAKE
                          Filed Sept. 15, 1924
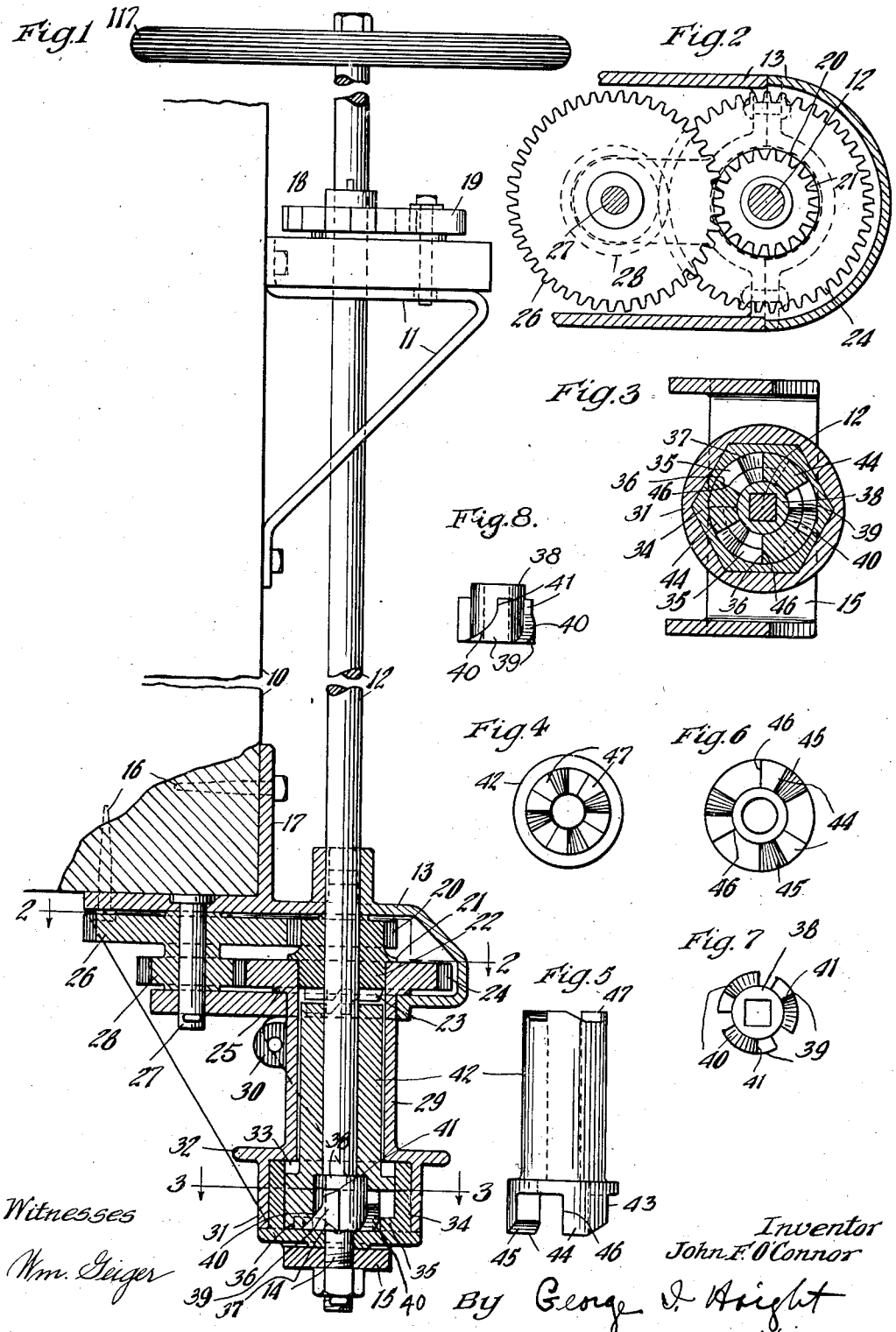

Patented Oct. 1, 1929

1,729,626

UNITED STATES PATENT OFFICE

JOHN F. O'CONNOR, OF CHICAGO, ILLINOIS, ASSIGNOR, BY MESNE ASSIGNMENTS, TO W. H. MINER, INC., A CORPORATION OF DELAWARE

BRAKE

Application filed September 15, 1924. Serial No. 737,650.

This invention relates to brakes.

An object of the invention is to provide a hand brake for railway cars and other vehicles, having means for quickly taking up the slack in the brake chain, and thereafter automatically increasing the leverage ratio pull on the brake chain during the final application of the brake.

A more particular object of the invention is to provide a hand brake of this character, including a plurality of transmitting means in the form of sets of gears for driving the brake drum to wind the chain thereon, such sets being arranged in positions to have different driving ratios relative to the brake drum, together with a cooperating clutch mechanism, including a shiftable device adapted for connection with one or the other set of gears, the shifting of such device being automatically brought about by encountering increased resistance after the slack of the brake chain has been taken up, to change from a direct drive of the drum, to a "multiple gear train" drive of slow speed and high capacity.

Still another object of the invention is to provide a driving mechanism including a device shiftable into driving connection with the gears, such mechanism including elements which initially serve to shift the clutch device out of engagement with the drum and into engagement with the gears, and provide a positive driving engagement at the end of the shifting movement.

Other and further objects of the invention will more fully and clearly appear from the description and claims hereinafter following.

In the drawings, Figure 1 is a view partly in section, and partly in elevation, of my invention as applied to a railway car. Figure 2 is a sectional view of the invention on the line 2—2 of Figure 1. Figure 3 is a sectional view of the invention on the line 3—3 of Figure 1. Figure 4 is a bottom plan view of a type of gear used in connection with the invention, showing clutch teeth thereon. Figure 5 is a side, elevational detail view of the shiftable clutch device employed in connection with my invention. Figure 6 is a bottom plan view of such clutch device and Figure 7 is a detail plan view of the driving element used in connection with my invention. Figure 8 is a side elevational view of the driving element employed in connection with the clutch mechanism.

Referring to the drawings, 10 represents a fragment of a railway car end, or other vehicle, to which the brake is to be secured. Mounted upon the end wall of the car 10 is a bracket 11, arranged to rotatably support one end of a brake staff 12, the lower portion of such brake staff extending through and being journaled in a housing 13, the extremity 14 of such shaft being rotatably mounted in a stirrup 15, forming part of the support for the housing 13. The housing 13 is secured to the end sill and end wall of the car by means of suitable fastening members 16 extending through the top wall of the housing and an angular flange 17 formed thereon, and into the adjacent portions of the car 10.

The upper portion of the staff 12 is provided with the usual hand wheel 117 for rotating such staff, and keyed to the staff adjacent the usual step supported by the bracket 11 is a ratchet wheel 18 arranged to cooperate with a foot operated pawl 19, the ratchet mechanism serving to permit rotation of the staff 12 in a clockwise direction, and preventing retrograde movement of such staff until the pawl is released.

Loosely mounted upon the part of the staff 12 which passes through the housing 13, is a relatively small gear 20, preferably having an intermediate flange 21 thereon, and a cylindrical extension 22, the undersurface of such extension being provided with a plurality of connecting elements in the form of teeth 23, such teeth having their forward faces vertically disposed and their rear faces inclined. Rotatably disposed about the cylindrical portion 22 of the gear 20, is a relatively larger gear 24, such gear being provided with an annular rib 25 on its undersurface arranged to bear upon the bottom wall of the housing 13, the upper surface of the gear 24 being engaged by the flange 21 on the small gear 20, whereby the gears are held against movement along the staff 12 by the top and bottom walls of the housing, though being free to rotate relatively to said staff and each other. The small gear 20 is arranged to mesh with a relatively larger gear 26 loosely mounted upon a countershaft 27 extending through the housing 13, such gear being preferably formed integral with a relatively smaller gear 28 mounted upon such countershaft, the gear 28 meshing with the relatively larger gear 24 mounted upon the cylindrical portion 22 of the gear 20.

The larger gear 24 is preferably provided with a hollow drum or sleeve disposed about the staff 14, and spaced therefrom, such sleeve forming the brake winding drum 29, there being a fastening member 30 on such drum to which the brake chain may be secured. The drum 29 has an enlarged portion 31 at its lower end, the under surface of such portion being arranged to rest upon the stirrup 15, and the upper part of such enlargement having a flange 32 thereon, which defines the lower end of the brake winding drum. The enlarged portion 31 provides a compartment 33 for the reception of a cup-shaped member 34, the inner walls of the compartment 31 being polygonal in plan to accommodate the correspondingly shaped outer walls of a member 34, thereby preventing rotative movement of the member 34 with respect to the brake drum. The inner chamber of the member 34 is annular, and in the bottom thereof, adjacent the side walls of such member, are disposed segmental connecting elements in the form of abutments 35, each of such abutments having a vertical rear wall 36, and a forward inclined portion 37.

Fixed to the lower end of the staff 12 is an annular driving element comprising a hub 38, upon which is mounted a plurality of radially disposed driving lugs 39, the diameter of the driving element, inclusive of the driving lugs, being such that it is disposed within the cup-shaped member 34, without engaging the abutments 35, though being closely contiguous thereto. Each of the lugs 39 is provided with a relatively long, inclined forward portion 40, and a shorter positive driving portion 41. Slidably disposed upon the staff 12 within the casing formed by the drum 29, and the enlarged portion 31, is a shiftable clutch device 42, the lower end of which is enlarged as shown at 43, and recessed to fit about the hub 38 of the driving element. The enlarged portion 43 is formed to provide a plurality of spaced extensions or legs 44, which are segmental in cross-section, and adapted to be disposed between the hub 38 of the driving element 39, and the annular walls of the member 34, the height of the enlarged portion being less than that of the compartment 33 to afford relative vertical displacement of the enlarged portion therein. The legs 44 of the clutch device have portions normally disposed within the spaces provided between the abutments 35 and the driving lugs 39, as shown in Figure 3. The rear wall of each leg 44 is inclined as shown at 45, while the forward wall 46 of each leg is vertically disposed, the arrangement being such that the forward inclined portions of the driving lugs 39 initially abut against the inclined rear walls of the legs 44, while the forward vertical walls of the legs abut against the forward vertical walls of the abutments 35. It will be here noted that the terms "forward" and "rear" refer to the various parts of the mechanism, assuming their movement in a clockwise direction. The opposite end portion of the clutch device 42 is provided with inclined teeth 47, corresponding to and adapted for engagement with the teeth 23 on the gear 20 in one position of the parts.

In operation, assuming the parts to be in the normal position shown by Figures 1 and 3 in which they are held by gravity, upon an initial rotation of the staff 12 in a clockwise direction, rotation is imparted to the driving element upon which are mounted the driving lugs 39. This rotary movement is communicated to the legs 44 of the clutch device 42 by reason of engagement of the inclined portions 40 of the driving lugs with the inclined portions 45 of the legs of the clutch device and thence by means of the straight faces 46 of the clutch device which engage the rear faces of the abutments 35. These abutments form part of member 34, which transmits the rotary movement to the drum 29. Upon a predetermined resistance being encountered, that is, when the slack has been taken up and more power is required to wind the brake drum the forwardly inclined faces 40 of the driving lugs 39 ride beneath the legs 44 of the clutch member, overcoming the frictional engagement between the forward portions of the legs and the rear portions of the abutments 35 while the brake chain and drum remain substantially inactive and stationary. The described action continues thereby raising the legs clear of such abutments, and, due to the length of the inclined faces 40 the clutch device 42, is raised a further distance until the portions 41 of the driving elements 39 are engaged. This movement serves to engage the teeth 47 of the clutch device and the teeth 23 formed on the gear 20. The cooperating engaging faces of the driving elements, and the legs of the clutch member in this position provide a positive driving engagement with the gear 20. The movement is now transmitted from the gear 20 to the large gear 26, small gear 28 and large gear 24, of which the sleeve 29 forms a part, which results in a great increase in the winding torque transmitted to the brake drum. Retrograde movement of the staff 12 during the above described operation is prevented by engagement of the pawl 19 with the ratchet wheel 18. When the pawl 19 is released, the tension on the brake chain causes counter-clockwise rotation of the drum, which results in rapid counter-clockwise rotation of the staff 12. When release is about completed, the frictional engagement of clutch and squared portion of staff, is not sufficient to longer hold the clutch 42 in upper position, and it automatically falls to initial position by gravity.

An important feature of the invention resides in providing a clutch device which is automatically shifted by the driving member, such shifting movement continuing a distance sufficient to clear the connecting clutch elements of the transmitting means from which it is disengaged, and the clutch device in its shifted position being arranged so as to have a positive driving engagement with the driving member. It should also be observed that the straight faces of the cooperating legs of the clutch device and the abutments serve to afford a frictional resistance to prevent the premature shifting of the clutch device. The construction affords an automatically shifting arrangement from high speed and relatively small, leverage ratio to low speed and relatively great leverage ratio with a positive driving and shifting mechanism.

I have herein shown and described what I now consider to be the preferred manner of carrying out my invention, but the same is merely illustrative and I contemplate all changes and modifications that come within the scope of the claims appended hereto.

I claim:

1. In a brake mechanism, the combination with a tightening element; of a plurality of transmitting means cooperating with said tightening element and having different ratios; a clutch device arranged for connection with either of said transmitting means; and independent means for shifting said clutch device from one to the other of said transmitting means.

2. In a brake mechanism, the combination with a tightening element; of a plurality of transmitting means cooperating with said tightening element and having different ratios; a clutch device arranged for connection with either of said transmitting means; and independent means for automatically shifting said clutch device from one to the other of said transmitting means upon encountering a predetermined resistance.

3. In a brake mechanism, the combination with a tightening element; of a plurality of transmitting means cooperating with said tightening element and having different ratios; a clutch device arranged for connection with either of said transmitting means; and means for driving and shifting said clutch device.

4. In a brake mechanism, the combination with a tightening element; of a plurality of transmitting means cooperaing with said tightening element and having different ratios; a clutch device arranged for connection with either of said transmitting means; and means for driving said clutch device, said driving means being arranged to shift said clutch device upon encountering a predetermined resistance.

5. In a brake mechanism, the combination with a tightening element; of a plurality of transmitting means cooperating with said tightening element and having different ratios; a clutch device arranged for connection with either of said transmitting means; means for automatically shifting said clutch device upon an increase in tension on said tightening element; and means for driving said clutch device.

6. In a brake mechanism, the combination with a tightening element; of a plurality of transmitting means cooperating with said tightening element; a clutch device arranged for connection with either of said transmitting means; means arranged to automatically shift said clutch from one transmitting means to another; and driving means having a positive driving connection with said clutch device in its shifted position.

7. In a brake mechanism, the combination with a tightening element; of a plurality of transmitting means cooperating with said tightening element; a clutch device arranged for connection with either of said transmitting means; and driving means arranged to automatically shift said clutch device from one to the other of said transmitting means and providing a positive driving connection therewith in the shifted position of said clutch member.

8. In a brake mechanism, the combination with a tightening element; of a plurality of transmitting means cooperating with said tightening element; a clutch device arranged for connection with either of said transmitting means; and means for shifting said clutch device from one to the other of said transmitting means, such shifting means serving to move said clutch device clear of the transmitting means from which it is disengaged.

9. In a brake mechanism, the combination with a tightening element; of a plurality of transmitting means cooperating with said tightening element; a clutch device arranged for connection with either of said transmitting means; means for shifting said clutch from one to the other of said transmitting means, such shifting means serving to move said clutch device clear of the transmitting means from which it is disengaged; and means for driving said clutch device.

10. In a brake mechanism, the combination with a tightening element; of a plurality of transmitting means cooperating with said tightening element and having different ratios; a clutch device arranged for connection with either of said transmitting means and adapted to be automatically shifted upon an increase in tension on said tightening element; and means for driving said clutch device.

11. In a brake mechanism, the combination with a tightening element; of a plurality of transmitting means cooperating with said tightening element and having different ratios, each of said transmitting means being provided with connecting elements; a clutch device having means for engagement with the connecting elements of either of said transmitting means; means for driving said clutch device and shifting the same from engagement with one to the other of said transmitting means, the shifting movement of such device being sufficient to move it free of the connecting elements of the transmitting means from which the clutch device is disengaged.

12. In a brake mechanism, the combination with a tightening element; of a plurality of transmitting means cooperating with said tightening element, each of said transmitting means being provided with connecting elements; a clutch device having means for engagement with the connecting elements of either of said transmitting means; means for driving said clutch device and shifting the same from engagement with one to the other of said transmitting means, the shifting movement of such device being sufficient to clear the connecting elements of the transmitting means from which the clutch device is disengaged; and means affording a positive driving connection between said driving means and said clutch device in its shifted position.

13. In a brake mechanism, the combination with a tightening element; of a plurality of transmitting means cooperating with said tightening element, each of said transmitting means having connecting elements associated therewith; a clutch device having means adapted to engage the connecting elements of one of said transmitting means; and driving means free of said connecting elements and arranged to engage said clutch device for driving the same.

14. In a brake mechanism, the combination with a tightening element; of a plurality of transmitting means cooperating with said tightening element, each of said transmitting means having connecting elements associated therewith, a clutch device having means normally in engagement with the connecting elements of one of said transmitting means; and driving means free of said connecting elements and arranged to engage said clutch device for driving the same, said driving means being provided with means for shifting said clutch device into engagement with another of said transmitting means.

15. In a brake mechanism, the combination with a tightening element; of a plurality of transmitting means cooperating with said tightening element and having different ratios, each of said transmitting means having connecting elements associated therewith; a clutch device having means normally in engagement with the connecting elements of one of said transmitting means; and driving means free of said connecting elements and arranged to engage means on said clutch device for driving the same, said driving means being arranged to shift said clutch member into engagement with another of said transmitting means upon a predetermined resistance being encountered, and having means providing a positive driving engagement with said clutch device in its shifted position.

16. In a brake mechanism, the combination with a tightening element; of a plurality of transmitting means cooperating with said tightening element and having different ratios, one of said transmitting means being provided with a transmitting member having abutments thereon, and a portion of another of said transmitting means being provided with connecting elements; a rotatable driving member cooperating with said transmitting member and having radially disposed driving lugs thereon, each of which is provided with an inclined portion, said driving lugs being free of said abutments; a clutch device having a portion cooperating with said transmitting member, and being provided with engaging extensions, the forward faces of which engage said abutments, and the rear faces of which are inclined and cooperate with the inclined faces of said driving lugs.

17. In a brake mechanism, the combination with a tightening element; of a plurality of transmitting means cooperating with said tightening element and having different ratios; means for driving said transmitting means, including a device including means adapted for connection with one of said transmitting means; automatic means for moving said device into engagement with another of said transmitting means upon a predetermined resistance being encountered, said connecting means including frictional surfaces disposed perpendicularly to the line of driving force.

18. In a brake mechanism, the combination with a tightening element; of a driving member; means for transmitting power from the driving member to the tightening element to apply the brakes, including a power-multiplying gear train and a shiftable clutch member for operatively connecting said tightening element either directly to the driving member or to said driving member through the power-multiplying gear train, said clutch member normally connecting the tightening element and driving member directly; and means actuated by said driving member and cooperating with said clutch member for automatically shifting the clutch member to break the direct connection between said driving member and tightening element and connect the tightening element to the driving member through said power-multiplying gear train when a predetermined resistance is encountered by said tightening element during application of the brakes.

In witness that I claim the foregoing I have hereunto subscribed my name this 11th day of September, 1924.

JOHN F. O'CONNOR.